Dec. 1, 1970        J. MacKEW        3,543,364
                   TOOL BIT HOLDER
Filed Aug. 30, 1968                  2 Sheets-Sheet 1

INVENTOR
JAMES MACKEW
BY Jeffers and Young
ATTORNEYS

3,543,364
TOOL BIT HOLDER
James MacKew, 5605 Riviera Drive,
Fort Wayne, Ind. 46805
Filed Aug. 30, 1968, Ser. No. 756,639
Int. Cl. B26d 1/00
U.S. Cl. 29—96     3 Claims

ABSTRACT OF THE DISCLOSURE

A tool bit holder is provided with a rectangular hole having rectangular plane sides and a bottom for receiving a cutting tool bit. Clamping screws project into the hole from the sides and bottom to hold the cutting tool bit. The cutting tool bit is clamped in either corner between two adjacent sides. The cutting tool bit may be quickly removed for replacement or sharpening and then reinserted and clamped in the original preset position. When so clamped, the tool bit is at the same preset location so that further realignment of the tool bit is not necessary to locate the best cutting position.

BACKGROUND OF THE INVENTION

My invention relates to an improved tool bit holder, and particularly to an improved tool bit holder that can be permanently located at the best possible working position, whereby the cutting tool bit can be replaced or removed for resharpening without altering the predetermined cutting or working plane of the bit.

In metal and plastic turning and shaping, much time is lost when a tool, such as a cutting tool bit for a turret lathe, automatic screw machine, and the like, must be removed for sharpening or replaced with a sharp tool bit. The actual replacement or sharpening of the tool bit does not cause much loss of production time since spare bits can be sharpened while another bit is in use. The major loss of production time results from the fact that when one tool bit is removed for replacement, it is necessary for the machinist or operator to position the new or sharpened tool bit at precisely the same plane or location with respect to the work or workpiece. This precise location is particularly necessary in machine tools, such as a thread cutting lathe, a turret lathe, an automatic screw machine, an engine lathe, or the like. During the time that the new tool bit is being positioned in the correct working plane, the entire machine is idle.

Accordingly, an object of my invention is to provide a new and improved holder for machine cutting tool bits.

Another object of my invention is to provide a new and improved tool bit holder which, after being initially positioned, permits bits to be quickly removed from and reinserted in the tool bit holder at the same position.

Another object of my invention is to provide an improved tool bit holder that is simple in construction and that has precise locating surfaces to permit a cutting tool bit to be removed from the tool bit holder and repositioned in the tool bit holder at the same precise location.

SUMMARY OF THE INVENTION

Briefly, these and other objects are achieved in accordance with my invention by a tool bit holder that has a rectangular shaped hole or box-like opening. The hole or opening is bounded by four rectangular, plane sides each of which is perpendicular to the adjacent sides. The hole also has a bottom. Clamping screws are threaded into the tool bit holder so that they project into the hole at right angles to each other. A tool bit is positioned in the hole at one corner formed by two sides, and then clamped at this location by the clamping screws. After the tool bit has been used so that it must be replaced or sharpened, it may be easily removed by loosening the clamping screws. The new or sharpened tool bit is positioned in the hole at the same corner, and the clamping screws tightened. Thus, the tool bit holder permits a tool bit to be removed for replacement or sharpening, and then quickly and accurately positioned in the holder at the same location.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
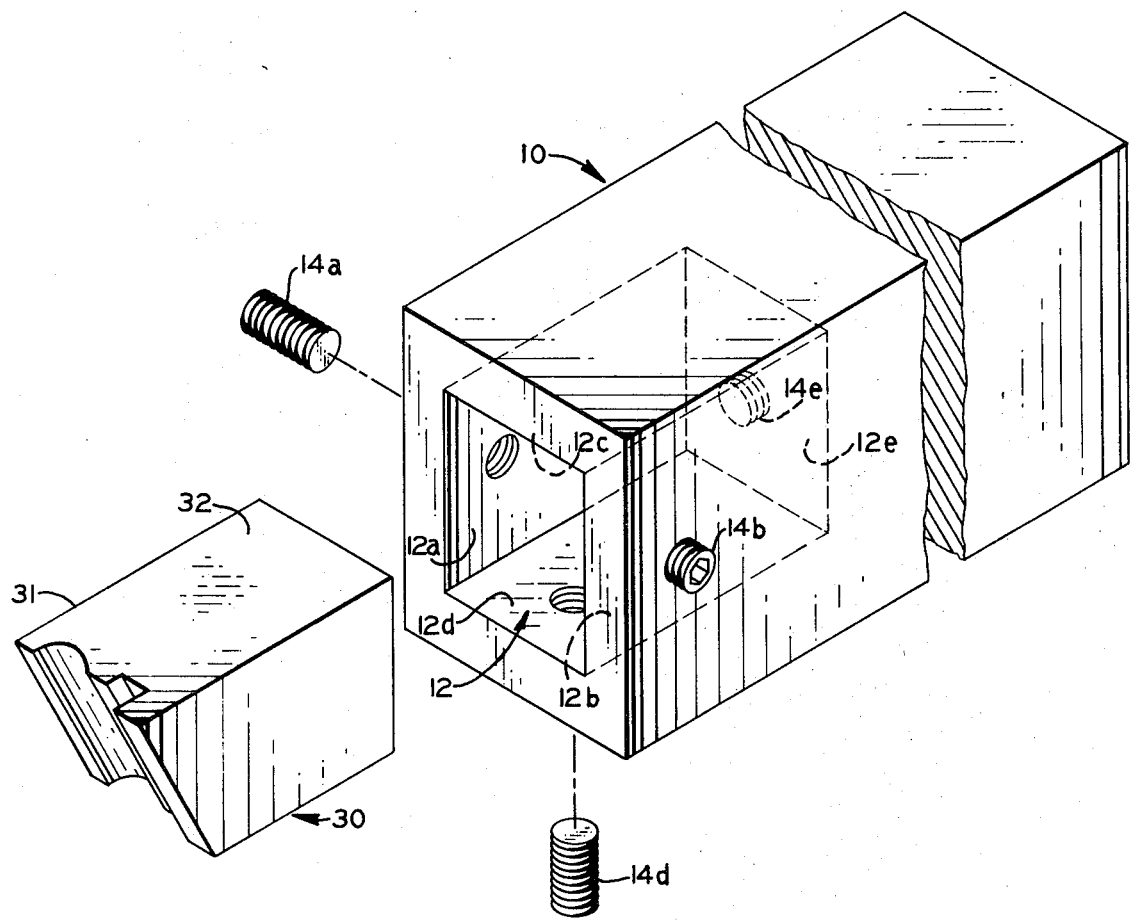
FIG. 1 shows a perspective view of a tool bit holder and a removed tool bit in accordance with my invention.

With reference to the three figures, I have shown one embodiment of a tool bit holder 10 in accordance with my invention. The tool bit holder 10 is made of any suitable material, and has an exterior shape of configuration to permit the tool bit holder 10 to be mounted in suitable tool holding arrangement provided on metal forming machines. Such holding means are not shown in order to keep the figures relatively simple. The tool bit holder 10 is provided with a rectangularly shaped or box-like hole or opening 12 which is large enough to accommodate or receive a cutting tool bit 30. The hole or opening 12 has rectangularly shaped plane sides 12a, 12b, 12c, 12d. The hole or opening 12 is ended or terminated by a rectangularly shaped plane bottom 12e. The sides 12a, 12b are preferably parallel to each other; and the sides 12c, 12d are preferably parallel to each other and perpendicular to the sides 12a, 12b. The bottom 12e is preferably perpendicular to all four sides 12a, 12b, 12c, 12d. Three of the sides 12a, 12b, 12d are provided with threaded holes or openings to receive respective clamping screws 14a, 14b, 14d. The axis of each threaded hole is perpendicular to the plane surface of its respective side, and the holes extend to the outside of the holder 10. An adjusting screw 14e may also be threaded into a blind hole in the bottom 12e if desired, although this adjusting screw 14e is not necessary. This is because the cutting tool 30 may be positioned directly against the bottom 12e. If a bottom threaded hole is provided, its axis is preferably parallel to the four sides 12a, 12b, 12c, 12d. The screws 14a, 14b, 14d, 14e may be provided with any suitable structure for turning them, such as the socket head shown.

Figure 2:
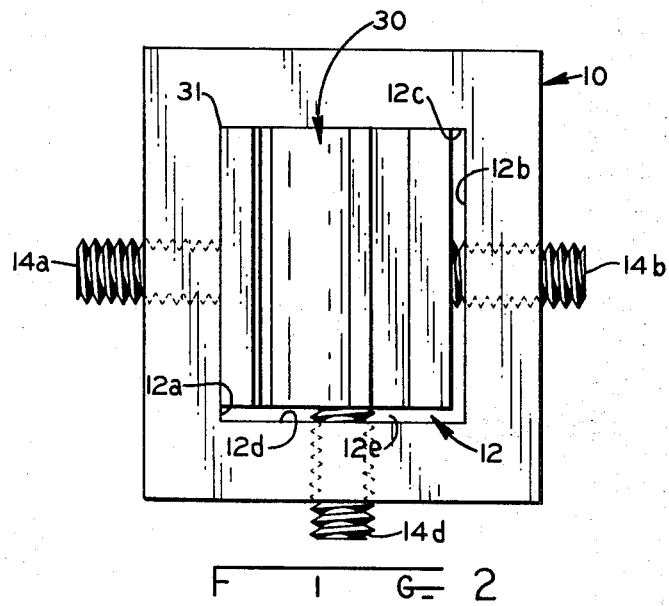
FIG. 2 shows a front elevation view of my tool bit holder of FIG. 1.
Figure 3:
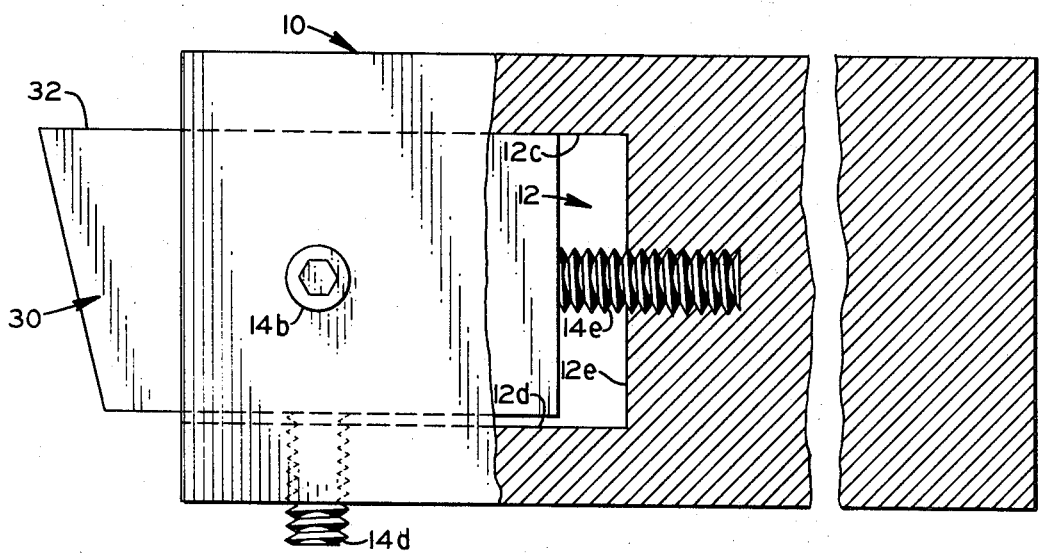
FIG. 3 shows a side elevation view, with a portion broken away, of my tool bit holder of FIG. 1.

When a cutting tool bit, such as the cutting tool bit 30 shown in the figures, is to be used with the tool bit holder 10, it is positioned in one corner between two adjacent sides of the hole or opening 12. The bit 30 can be positioned at either the right or left side of the holder 10, depending on requirements. If the bit 30 is positioned at the left side as shown in FIG. 2, the clamping screws 14b, 14d are advanced to tightly clamp the cutting tool bit 30 against the sides 12a, 12c. If positioned at the right side, the clamping screws 14a, 14d are advanced to tightly clamp the bit 30 against the sides 12b, 12c. If used, the adjusting screws 14e is advanced until the cutting tool bit 30 project outwardly from the tool holder 10 the desired distance. The means for supporting the tool bit holder 10 can be achieved by any practical means suitable to the machine. The tool holder 10 is positioned so that a corner 31 and the cutting plane 32 of the bit 30 are at the desired location. The machine tool is then used. After the cutting tool bit 30 has been used and becomes dull, it may then be removed for replacement or sharpening. This is easily and quickly done by loosening the clamping screws 14b, 14d, and removing the bit 30. The same or another bit sharpened along its entire cutting plane 32 is replaced in the exact previous position without error or change. The clamping screws 14b, 14d are then tightened to urge the cutting tool 30 into the corner between the sides 12a, 12c. The cutting plane 32 and the corner 31 are automatically located at the same position as before, because the surfaces forming the corner 31 are located against the same sides 12a, 12c. Thus, machining or cutting may be immediately resumed. It is not necessary that the time be consumed in accurately relocating the tool bit to match the edge of a resharpened bit, or of a new bit.

It will thus be seen that I have provided a new and improved tool bit holder which permits quick replacement of a tool bit with the replaced tool bit precisely and accurately located at the same desired location as the previously used bit. Time consuming adjustments to accurately and precisely locate the cutting tool are no longer needed. All that is required is that the new or sharpened bit be inserted in my tool bit holder, and two clamping screws tightened. While I have shown only one embodiment of my invention, persons skilled in the art will appreciate that modifications may be made. For example, the cutting tool bit may be positioned in a different corner between another pair of adjacent sides, rather than the one pair of sides shown in the embodiment. The bottom 12e need not be plane. And, the adjusting screw 14e at the bottom 12e of the opening 12 may be omitted. Also, two or more screws may be used at each of the sides 12a, 12b, 12c, 12d and at the bottom 12e. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved tool bit holder for cutting tool bits and the like, comprising:
    (a) a metallic body having the desired outer configuration to be received in machine tool holding means;
    (b) said body having a substantially rectangular hole in one face thereof, said hole extending from said one face and terminating in a bottom, said hole having four sides, the first, second and third of which are formed by rectangular, plane surfaces that are perpendicular to each of the adjacent plane surfaces, the fourth surface being an arbitrary surface;
    (c) and threaded screw holes in the first and third opposed plane sides and in said fourth side for receiving clamping screws, each of said screw holes having an axis that is perpendicular to at least one of said plane side surfaces and that extends from its respective side surface to an outer surface of said body said second surface having no threaded screw hole and serving as a reference surface which in conjunction with one of its adjacent plane surfaces allows a tool bit to be removed and subsequently reinserted to the same position relative to a work piece without operator adjustments.

2. The improved tool bit holder of claim 1 wherein each of said threaded screw holes is positioned the same distance from said body face having said rectangular hole.

3. The improved tool bit holder of claim 1 and further comprising a threaded screw hole in said bottom for receiving a clamping screw, said bottom screw hole having an axis that is parallel to all of said side plane surfaces.

References Cited

UNITED STATES PATENTS

| | | | |
|---|---|---|---|
| 1,355,698 | 10/1920 | Rouillard | 29—96 |
| 2,414,811 | 1/1947 | Hollis | 29—96 |
| 2,475,049 | 7/1949 | Premo | 82—36 |
| 3,382,746 | 5/1968 | Tucker | 82—36 |

HARRISON L. HINSON, Primary Examiner

U.S. Cl. X.R.

82—36